United States Patent [19]
Ishii et al.

[11] 4,079,649
[45] Mar. 21, 1978

[54] ROLLING CUT TYPE DOUBLE SIDE SHEAR

[75] Inventors: Hikonori Ishii; Satoru Kumabe, both of Yokohama, Japan

[73] Assignees: Ishikawajima-Harima Jukogyo Kaisha; Tokushu Shunsetsu Kabushiki Kaisha, both of Tokyo, Japan

[21] Appl. No.: 748,564

[22] Filed: Dec. 8, 1976

[30] Foreign Application Priority Data

Feb. 10, 1976 Japan ................... 51-13528

[51] Int. Cl.² ............... B23D 15/12; B23D 31/02
[52] U.S. Cl. .................... 83/519; 83/237; 83/582; 83/644; 83/923
[58] Field of Search .......... 83/644, 646, 647.5, 83/626, 923, 618, 408, 513, 519, 582, 237

[56] References Cited

U.S. PATENT DOCUMENTS 3,667,335  6/1972  Hamacher .......... 83/923 X
3,726,170  4/1973  Hofen ............... 83/626 X

FOREIGN PATENT DOCUMENTS 1,392,140  2/1965  France ............... 83/626

Primary Examiner—J. M. Meister
Attorney, Agent, or Firm—Scrivener, Parker, Scrivener & Clarke

[57] ABSTRACT

Disclosed is a rolling cut type double side shear wherein an upper side cutting blade and an upper scrap-cutting blade are driven by one crank shaft which has three eccentric sections, so as to increase the production efficiency and to make the shear simple in construction and compact in size.

1 Claim, 6 Drawing Figures

ROLLING CUT TYPE DOUBLE SIDE SHEAR

DETAILED DESCRIPTION OF THE INVENTION

When a side shear is used to cut off the sides of a steel plate, a cycle consisting of cutting off both sides of the plate for a predetermined length and then feeding the plate a predetermined length is repeated until whole length of the sides of the plate are completely cut off. However, the feed speed is limited by the duty cycle of the pinch roll motors so that the shearing speed must be increased as practically as possible so as to increase the production efficiency.

In one example of the prior art side shears shown in FIG. 1, an upper blade holder c is operatively coupled through connecting rods b to two crankshafts a, which extend in the direction of the width of a steel plate to be sheared, so that a side-cutting upper blade d and a upper scrap-cutting blade e swing to cut off the side of the steel plate in cooperation with a lower side-cutting blade d'. With this side shear, the scrap-cutting is effected below the pass-line of the steel plate. Therefore when the upper side-cutting blade d and the upper scrap-cutting blade e are swung in unison, the upper scrap-cutting blade e which extends below the edge of the lower side-cutting blade d' interferes with the feed of the steel plate. That is, the feed of the steel plate cannot be started until the upper side-cutting blade d moves away from the steel plate and the edge of the upper scrap-cutting blade e rises above the upper surface of the steel plate. As a result, the high speed and highly efficient operation of the side shear cannot be carried on. Furthermore, as shown in FIG. 3 the crankshafts a are drivingly coupled to motors f through a large number of gears g. Therefore, many components such as bearings, shafts, gear cases and so on for supporting the gears g are required so that the shear is very complex in construction, very expensive to manufacture and very difficult to inspect and maintain.

Another example of the prior art side shears is shown in FIG. 2. In this side shear, the upper side-cutting blade d swings upon rotation of the crankshafts a independently of the upper scrap-cutting blade e which is swung by a crankshaft a'. Therefore the feed may be started independently of the motion of the upper scrap-cutting blade e. However, the additional crankshat a' must be provided so that, as compared with the side shear of the type shown in FIG. 1, more gears, bearings, shafts and so on are required and consequently the cost is more expensive and the inspection and maintenance becomes more complex and difficult.

In view of the above, one of the objects of the present invention is to provide a side shear which may optimize the timing of the scrap-cutting and the time required, thereby minimizing the scrap cutting time in the overall side cutting time and which requires a minimum number of components and is simple in construction and compact in size.

The present invention will become more apparent from the following description of a preferred embodiment thereof taken in conjunction with the accompanying drawings, in which.

Figure 1:
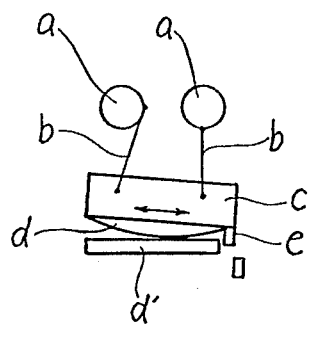
FIGS. 1 and 2 are schematic diagrams of the prior art side shears.
Figure 2:
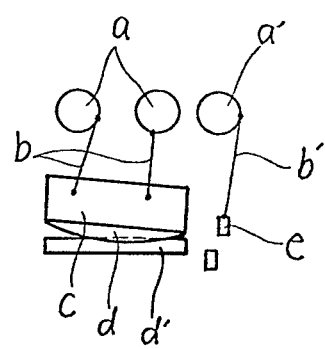
Figure 3:
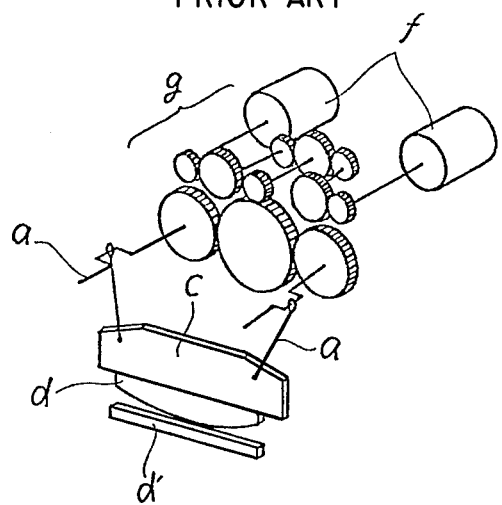
FIG. 3 is a schematic perspective view of a driving system used in the prior art shears.
Figure 4:
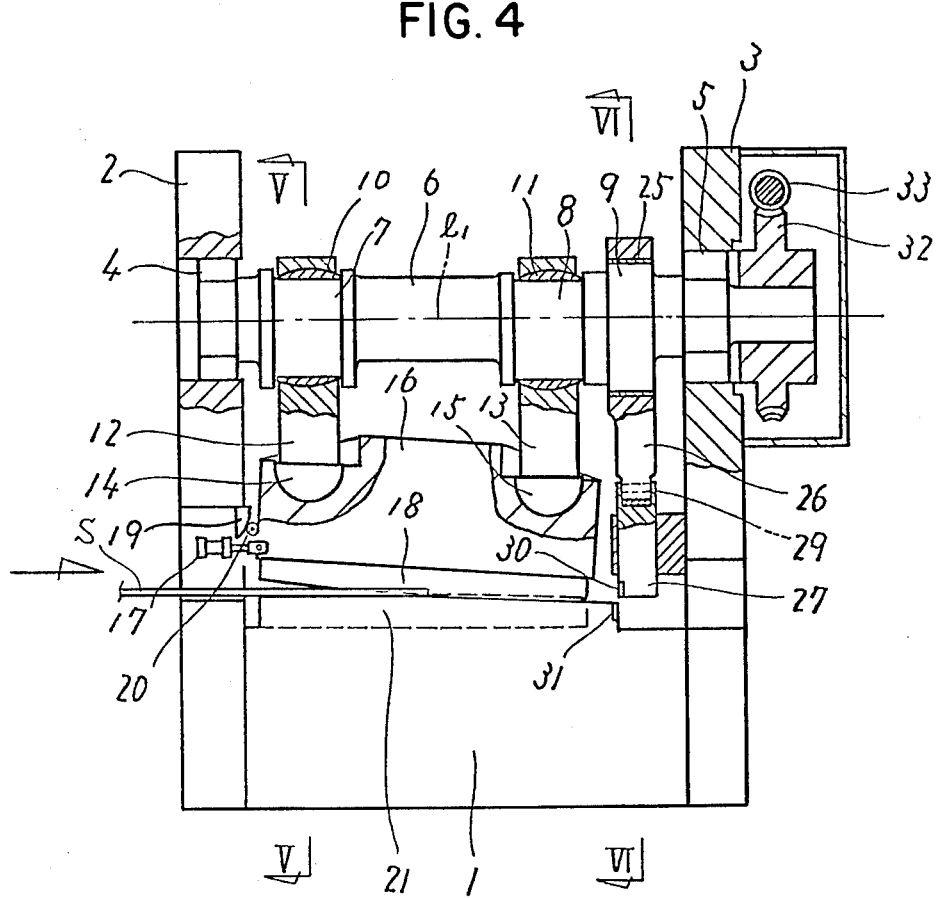
FIG. 4 is a front view, partly broken, of one unit of rolling cut type double side shears in accordance with the present invention.

Referring to FIG. 4, a lower blade stand 1 is interposed between the shear frames 2 and 3 on each side of the passage of a steel plate S. A crankshaft 6 is supported by bearings 4 and 5 which in turn are mounted on the shear frames 2 and 3 in such a way that the axis $i_1$ of the crankshaft 6 is in parallel with the direction of the feed of the steel plate S. The crankshaft 6 has first, second and third eccentric sections 7, 8 and 9 each having a different eccentric radius and angle. The upper end of each connecting rod 12 or 13 is attached to the first or second eccentric section 7 or 8 with a spherical bearing 10 or 11 interposed therebetween, whereas the lower end of the connecting rod 12 or 13 is attached to an upper side-cutting blade holder 16 with a spherical bearing 14 or 15 interposed therebetween. A cam plate 19 which is attached to the shear frame 2 on the entry side has a cam surface such that an upper side-cutting blade 18 attached to the lower portion of the upper side-cutting blade holder 16 may roll over the steel strip S without any slip relative thereto. A roller 20 is interposed between the entry side of the upper side-cutting blade holder 16 and the cam plate 19 and is pressed against the cam plate 19 by a hydraulic cylinder 17 so that the roller 20 may guide the upper side-cutting blade holder 16 along the cam surface of the cam plate 19.

Figure 5:
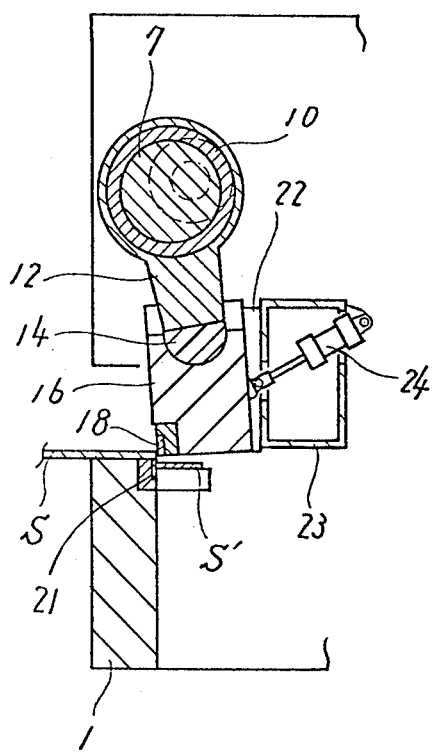
FIG. 5 is a sectional view taken along line V—V of FIG. 4.

As shown in FIG. 5, wedges 22 are interposed between the back side surface of the upper blade holder 16 and a frame 23, so that the holder 16 is pulled by the hydraulic cylinder 24 to slide in close contact with the wedges. One end of the hydraulic cylinder 24 is pivoted to the holder 16 and the other end pivoted to the frame 23. The wedges 22 may be vertically displaced by suitable means so that the gap between the upper side-cutting blade 18 and a lower side-cutting blade 21 attached to the upper portion of the stand 1 may be suitably adjusted.

Figure 6:
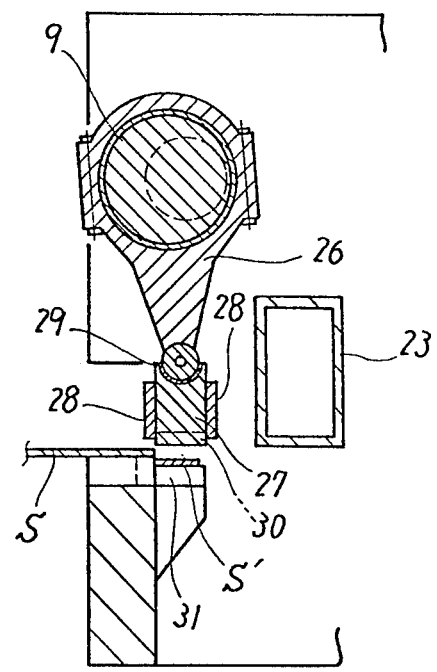
FIG. 6 is a sectional view taken along the line VI—VI of FIG. 4.

Next referring to FIGS. 4 and 6, a connecting rod 26 has its upper end fitted over the third eccentric section 9 with a bushing 25 interposed therebetween (See FIG. 4). The lower end of the connecting rod 26 is pivoted with a pin 29 to an upper scrap-cutting blade holder 27, which is guided by guides 28 for vertical slidable movements. An scrap-cutting blade 30 is attached to the lower end of the holder 27, and a lower scrap-cutting blade 31 is attached to the upper portion of the stand 1 at the downstream of the lower side-cutting blade 21. The upper and lower scrap-cutting blades 30 and 31 cooperate to cut off from the steel plate S the projected scrap S' trimmed by the upper and lower side-cutting blades 18 and 21 and extended in the direction of the feed of the steel plate S.

A worm wheel 32 carried by the delivery end of the crankshaft 6 is in mesh with a worm 33 which in turn is drivingly coupled to a prime mover (not shown).

Next the mode of operation will be described. The power from the prime mover (not shown) is transmitted through the worm 33 and the worm wheel 32 to the crankshaft 6. The first and second eccentric sections 7 and 8 are different in eccentric radius and angle so that upon one rotation of the crankshaft 6, the upper side-cutting blade holder 16 which is operatively coupled to the crankshaft 6 with the connecting rods 12 and 13 swings while displacing itself vertically a stroke equal to the twofold of the eccentricity of the eccentric sections 7 and 8. The upper side-cutting blade 18 has a downwardly curved edge so that when the upper side-cutting blade holder 16 swings, the upper blade 18 rolls relative to the lower side cutting blade 21.

While the upper side cutting blade 18 is in the position above the steel plate, the steel plate S is advanced in the direction indicated by the arrow in FIG. 4 into the rolling type side shear and is stopped and held securely in a predetermined position. And each side of the steel plate S is cut starting from the downstream side to the upstream side by the upper and lower side-cutting blades 18 and 21 and that the projected scrap S' extended in the direction of the feed of the plate S is cut out from the steel plate S. When side cutting, the upper side-cutting blade holder 16 is guided by the roller 20 and the hydraulic cylinder 17 along the cam surface of the cam plate 19 so that the upper side-cutting blade 18 may be prevented from slipping relative to the steel plate S. After cutting out the scrap S', the steel plate S is advanced by a predetermined distance while the upper blade 18 is moved away therefrom, and when the steel plate S is stopped and securely held in operative position, the side cutting operation is repeated in the same manner.

As described previously, the blade holder 27 carrying the upper scrap-cutting blade 31 is operatively coupled through the connecting rod 26 to the third eccentric section 9 of the crankshaft 6. Therefore, upon rotation of the crankshaft 6, the scrap-cutting blade 30 is forced downward to co-act with the lower scrap-cutting blade 31 to cut off the projected scrap S' into a predetermined length. The eccentric radius and angle of the third eccentric section 9 with respect to the first and second eccentric sections 7 and 8 are so selected that the time interval, when the upper scrap-cutting blade 30 moves downward to the surface of the steel plate S, cuts off the scrap S' and then moves upwardly away from the upper surface of the steel plate S, may be optimized. In other words, the eccentric radius and angle of the third eccentric section 9 are so selected that the steel strip S may be advanced immediately after the side cutting and kept on feeding till just before the start of the subsequent side cutting, so that a longer feed time may be available.

It will be understood that the present invention is not limited to the above preferred embodiment and that variations and modifications may be effected without departing from the true spirit of the present invention. For instance, instead of the reduction gear consisting of the worm 33 and the worm wheel 32, any other suitable reduction gears may be used. And instead of hydraulic cylinder 17, the cam plate 19 and the roller 20, any other suitable guide may be used.

In summary, the features and advantages of the rolling cut type side shear in accordance with the present invention are;

(I) that the upper scrap-cutting blade is operatively coupled to the eccentric section of the crankshaft different from the eccentric sections to which is operatively coupled the upper side-cutting blade holder so that the scrap cutting timing and period may be optimumly selected and consequently the time interval between the side cutting operations may be reduced considerably, whereby the overall production efficiency may be remarkably improved, and (II) that three connecting rods may be driven by one crankshaft so that not only the driving systems but also the shear itself may be made simple in construction and compact in size, the number of components or parts may be reduced to the minimum with the result of reduction in cost, and the inspection and maintenance may be greatly facilitated.

We claim:

1. A rolling cut type double shear of the type having a lower blade stand and a lower side-cutting blade for cutting the side of a steel plate secured to said stand, the improvement which comprises an upper side-cutting blade holder having an upper side-cutting blade secured thereto for cooperation with said lower side-cutting blade, a crank shaft having its axis arranged parallel to the direction of feed of the steel plate, first and second spaced apart eccentrics carried by said shaft, means including connecting rods connecting the eccentrics with opposite ends of said blade holder, said eccentrics being constructed and arranged to impart a combined vertical and rolling motion to said blade holder and the upper side-cutting blade secured thereto, a lower scrap-cutting blade secured to the lower blade stand at the downstream end of the lower side-cutting blade, an upper scrap-cutting blade for cooperation with said lower scrap-cutting blade, a third eccentric carried by said shaft, means including a connecting rod connecting the third eccentric with said upper scrap-cutting blade, said third eccentric being constructed and arranged with respect to the first and second eccentrics to move the upper scrap-cutting blade to cut off the scrap as the upper side-cutting blade holder is moving upwardly to allow feeding of the steel strip immediately following the cutting off of the scrap.

* * * * *

UNITED STATES PATENT OFFICE
CERTIFICATE OF CORRECTION

Patent No. 4,079,649          Dated March 21, 1978

Inventor(s) Ishii, Hikonori and Kumabe, Satoru

It is certified that error appears in the above-identified patent and that said Letters Patent are hereby corrected as shown below:

Change the Assignee on the Patent as follows to read:

"Ishikawajima-Harima Jukogyo Kabushiki Kaisha, Tokyo, Japan".

Signed and Sealed this

Fifth Day of September 1978

[SEAL]

Attest:

RUTH C. MASON  
*Attesting Officer*

DONALD W. BANNER  
*Commissioner of Patents and Trademarks*